Figure 1:
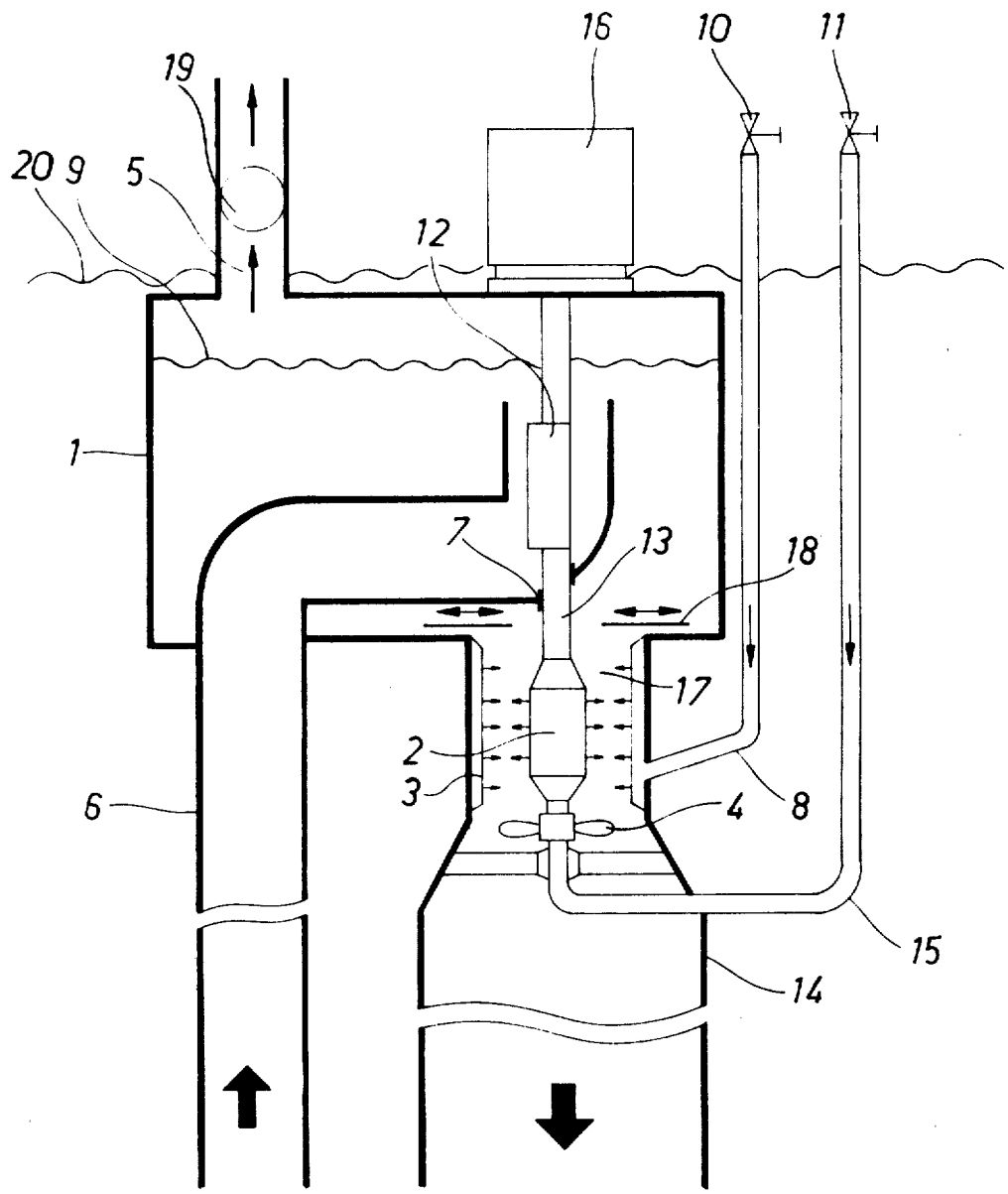

United States Patent [19]

Isteri

[11] 4,045,336
[45] Aug. 30, 1977

[54] METHOD AND DEVICE FOR OXYGENATING WATER WITH VIBRATIONS AND UNDER PRESSURE STROKES

[76] Inventor: Pauli Henrik Isteri, Siilitie 9 S 223 00800, Helsinki 80, Finland

[21] Appl. No.: 614,876

[22] Filed: Sept. 19, 1975

[30] Foreign Application Priority Data

Sept. 27, 1974  Finland .................. 742479
Aug. 8, 1975  Finland .................. 752256

[51] Int. Cl.² .......... C02C 1/02; C02C 5/02; C02C 5/10; C02B 1/78
[52] U.S. Cl. .................. 210/15; 210/19; 210/63 R; 210/219; 210/221 P; 55/55; 55/193; 55/196; 55/245; 55/256; 261/77; 261/87; 261/DIG. 75
[58] Field of Search .......... 210/15, 19, 63, 84, 210/220, 219, 221 P; 55/55, 193, 196, 245, 256; 261/77, 81, 87, DIG. 75

[56] References Cited

U.S. PATENT DOCUMENTS

| | | | |
|---|---|---|---|
| 2,068,099 | 1/1937 | Engle | 210/19 |
| 2,097,876 | 11/1937 | Fuetterer | 210/220 |
| 2,147,677 | 2/1939 | Smith | 55/55 |
| 2,344,066 | 5/1956 | Spiess | 210/19 |
| 2,417,722 | 3/1947 | Wolff | 210/19 |
| 2,425,932 | 8/1947 | Green | 210/84 |
| 2,530,814 | 11/1950 | Becze | 210/219 |
| 2,717,874 | 9/1955 | Verain | 210/19 |
| 2,770,365 | 11/1956 | Welsch | 210/15 |
| 3,049,489 | 8/1962 | Ciabuttari | 210/15 |
| 3,074,856 | 1/1963 | Meliss | 210/19 |
| 3,086,841 | 4/1963 | Hart | 261/77 |
| 3,108,146 | 10/1963 | Gross | 261/87 |
| 3,206,176 | 9/1965 | Peterson | 210/220 |
| 3,231,491 | 1/1966 | Knap | 210/44 |
| 3,264,213 | 8/1966 | Pav | 210/15 |
| 3,316,693 | 5/1967 | Fermor | 55/256 |
| 3,415,378 | 12/1968 | Fukuda | 210/220 |
| 3,488,159 | 1/1970 | Moon | 210/19 |
| 3,756,580 | 9/1973 | Dunn | 55/256 |
| 3,772,188 | 11/1973 | Edwards | 210/15 |
| 3,788,616 | 1/1974 | Clough | 261/81 |
| 3,794,303 | 2/1974 | Hirshon | 261/DIG. 75 |
| 3,805,481 | 4/1974 | Armstrong | 210/220 |
| 3,933,640 | 1/1976 | Kirk | 210/219 |

*Primary Examiner*—Thomas G. Wyse
*Assistant Examiner*—Ernest G. Therkorn
*Attorney, Agent, or Firm*—Mason, Kolehmainen, Rathburn & Wyss

[57] ABSTRACT

Method and apparatus for increasing the oxygen content of water for sanitizing natural waters and for purifying water, in which method oxygen or oxygen containing gas is fed into water liberated from gases dissolved therein, characterized in that gases are separated by pressure strokes on the liquid and/or vibration whereafter the desired gas, e.g. air, oxygen or oxygen containing gas, is fed into the liquid.

16 Claims, 3 Drawing Figures

METHOD AND DEVICE FOR OXYGENATING WATER WITH VIBRATIONS AND UNDER PRESSURE STROKES

The invention relates to a method and a device for removing noxious gases from and adding desired gas to liquids. Dissolving gases in liquid is being used in many fields of chemical industry and in fields of current interest, such as waste water purification and aerations of natural waters. The dissolving speed rate of a gas into a liquid is essentially affected by the concentration differences, the pressure of the gas and the liquid, by diffusion surface area and, furthermore, by the amount of gases already dissolved in liquid.

One disadvantage in the known aerating devices has generally been the fact that they do not produce evenly distributed and sufficiently small bubbles in untreated liquid whereby quite poor oxygen dissolving result, considering the used effect, is obtained which result becomes even poorer because gas is supplied into liquid which is already practically saturated with gas. It is obvious that the smaller the bubble size the larger the total surface area of the quantity of gas used for treatment which area, in turn, is directly proportional to the obtained degree of dissolution of oxygen. Also the known assemblies have constructively been relatively complicated and their energy consumption has been disproportionately high as compared to the degree of dissolution of oxygen. Since this type of assemblies are usually manufactured for continuous operation, the last-mentioned detail is of great significance, i.e. as low energy expenses as possible should always be aimed at.

To improve known methods it has been proposed to liberate dissolved gases and subsequent adding of gas to the liquid.

Removal of gases by using ultrasonic waves and vacuum is disclosed in the U.S. Pat. No. 3,591,946 which system is aimed at the treating of insulating oils in which case the gas to be removed is not replaced by oxygen or any other desired gas.

Additionally there is known a separating apparatus for gases, e.g. Swedish Patent Publication nr 354,265, according to which the liquid under pressure is sprayed. A similar solution has also been disclosed in the German Pat. No. 583,849 in which the liquid is fed under pressure through an ejectorlike nozzle in which the gas, due to the ejector effect, is absorbed into the liquid. However, gases already present in liquid are not removed by these devices. It is significant, according to the present invention, that gases present in the liquid be first removed as effectively as possible, and oxygen gas or air is dissolved in the liquid thereafter.

In known aerobic methods for cleaning waste water air or oxygen is blown into waste water in order to effect bacterial fermentation. The oxygen content in waste water is, however, decisively dependent on the contents of gases and other substances already dissolved in water. However, these contents are usually so high that effective solution of oxygen cannot be effected.

The purpose of the present invention is to provide a device by means of which waste water can aerobically be effectively cleaned by considerably increasing the oxygen content in waste water.

One feature of the present invention is that the oxidation zone is located below the flotation and the settling zones, and from the oxidation zone the liquid to be cleaned will be, at least partly, circulated back to the flotation zone, and from which liquid the gas, already dissolved therein, will be removed and oxygen gas or air will be added to the liquid.

Another feature of the device according to the invention is that the floatation zone consists of a cylindrical, downwardly opening tunnel means which houses an open top supply tube extending to the oxidation zone which tube comprises a per se known oxidation and circulation means for liquid and to the outer wall of the tube there is secured at least one vibration means.

Plants for biologically purification of waste waters usually comprise two or three basins. In the first one, i.e. pre-settling basin, the easily precipitated and settled material is removed. In the second basin, the aerating basin, into the threated water the slurry of bacteria is added and air or oxygen is dissolved to maintain the aerobic activity of bacteria. From this aerating basin the waste water is led to a third basin, i.e. the settling basin, in which the sediment and the clean water is separated and the sediment is recycled to the start of the process.

Mecanic-biological purification based on flotation is also known. The impurities are gathered on the liquid surface using aeration and the floating slurry is removed mecanically.

In biologic water purification carbon dioxide is produced in an amount corresponding to the amount of oxygen consumed by the bacteria. Because of the fact that such biological process continuously consumes oxygen considerable concentrations of carbon dioxide (20 to 30 mg/l in water of 25° C) have been found. The continuity of the process is, however, disturbed because of the carbon dioxide saturation of the liquid to be treated. Due to this the oxygen content dissolved in the liquids of such processes may be as low as 0 to 3 mg/l in 25° C.

The aerobic activity of the bacteria is depending on three criteria: temperature, nutrition and oxygen supply. As the temperature and nutrition easily can be settled satisfactorily the question of oxygen supply is a harder problem.

The invention is mainly characterized in that gases are separated by pressure strokes on the liquid and/or by setting the liquid in vibrating motion whereafter a desired gas, e.g. oxygen, is fed into the liquid.

According to one advantageous embodiment water flowing along a suction pipe is set to vibrate by means of a vibrator from where water is discharged into a tank, and noxious gases escape from the water through the tank opening, the water is sucked out of the tank by means of a propeller pump into the gas feed zone provided by dispersion means which zone is connected to a source of gas through pipes, gas bubbles formed on wet surfaces of the dispersion means are mixed with flowing water, the propeller pump then pressing the treated water into a supply pipe and therealong to the desired path.

The device according to the invention comprises a suction and supply pipe for water, a rotary propeller and gas feeding means, the device being characterized in that the suction pipe houses vibration means and the supply pipe houses a gas feed zone which consists of a rotating cylindrical dispersion means disposed centrally of the pipe and optionally of annular outmost dispersion means.

Further this advice is characterized in combining two types purification plants, a settling type and a flotating type. In the device the main flow of liquid to be treated is recycled to the flotation zone, where the gases dissolved in the liquid are removed and oxygen or air is introduced.

Due to the recycling considerable flocculation may be prevented thus making an undisturbed aeration possible. Further the repeated treatment (stroke-oxygen addition) effectively removes indesired dissolved gas improving the absorption of oxygen into the liquid.

The oxidation zone and settling zone are in the same basin the oxidation zone situated under the settling zone whereby the pressure required for the absorption of oxygen may be fully utilized.

The device according to the invention provides a compact construction which furthermore, thanks to circulation of liquid, provides effective absorbtion of oxygen into the liquid. Absorbtion is made more effective by removing gases dissolved in waste water. The gas removal from the liquid which is effected by vibration creates, simultaneously, flotation action in the tunnel means bringing impurities to the surface where they can be peeled off.

The method and the device according to the invention will be described in more detail with reference to the accompanying drawings and the examples of embodiments presented therein.

Figure 2:
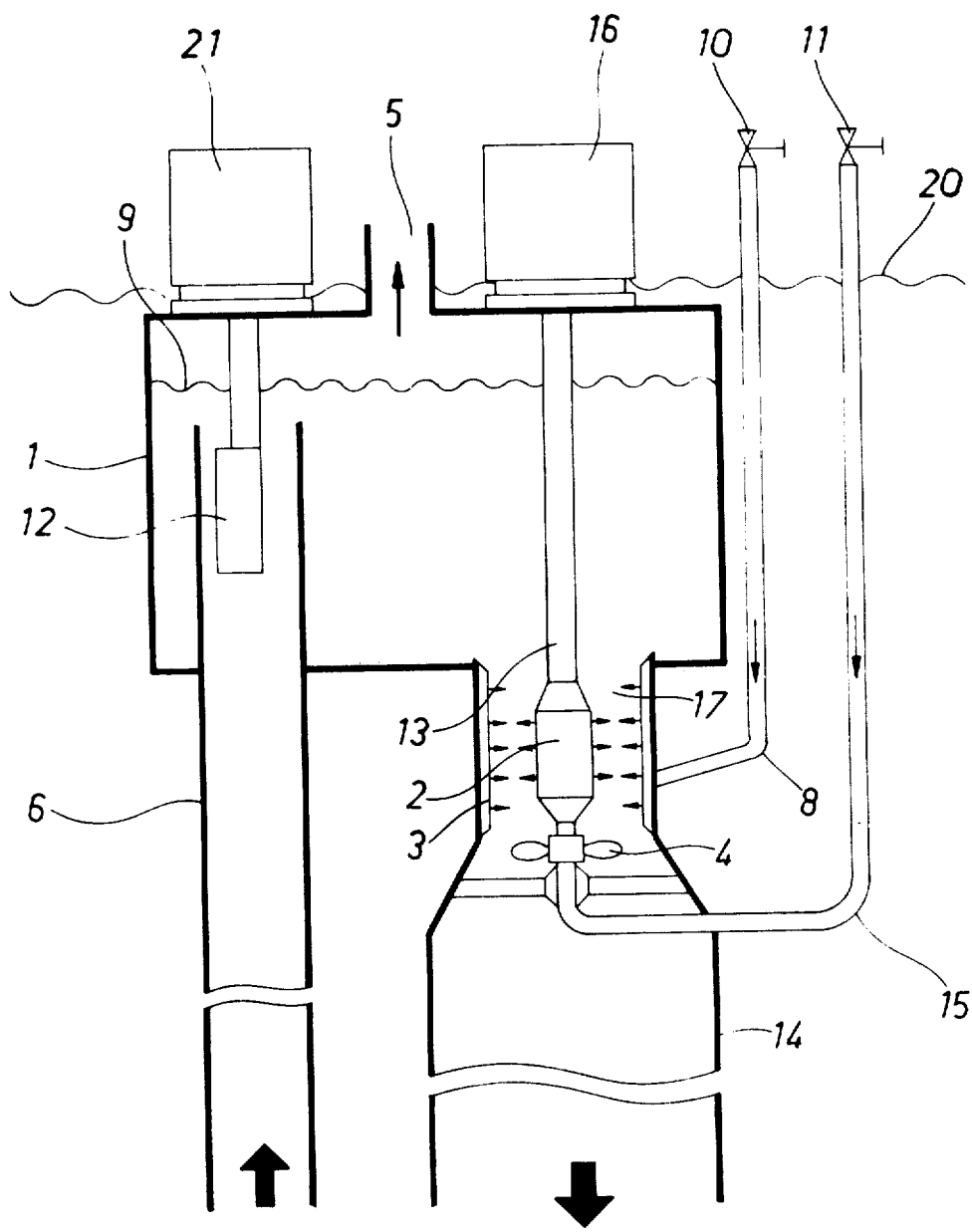
Figure 3:
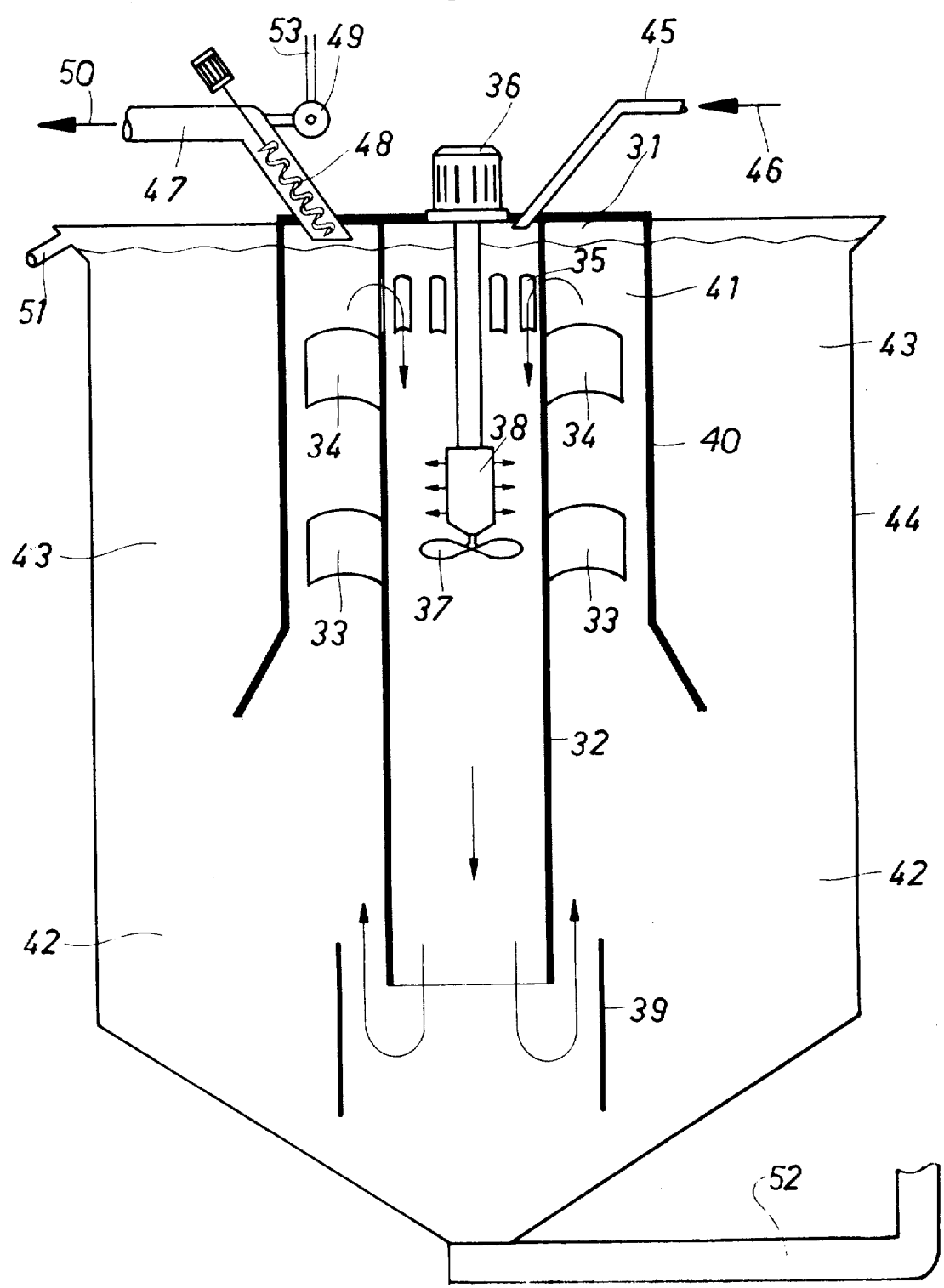

FIG. 1 is a sectional side view of the device,
FIG. 2 shows another embodiments of the device, and
FIG. 3 shows a third embodiments of the invention.

In the device according to FIG. 1 the tank 1 lies a little below the water surface 20 and the lower end of the suction pipe 6 of the device is placed in the water to be treated at the desired depth from where water is sucked by means of the rotary propeller 4 and is then led from the pressure side of the propeller in oxidized condition to appropriate spot and depth. The propeller drive shaft 13 rotated by the motor 16 is hollow up to the dispersion means 2. The drive shaft 13 carries eccentrically the vibration means 12 so that the suction pipe 6 lies by the vibration means 12. The hollow part of the propeller drive shaft 13 is through a pressure relief valve 11 connected to a source of gas which can either be air or an oxygen gas tank. The hollow drive shaft 13 has been brought through the wall of the suction pipe 6 by means of a bearing 7. The upper end of the suction pipe 6 is disposed inside the tank 1 and in the upper end thereof the liquid is set to vibrating motion by the vibration means 12 and thus releasing the gases dissolved in water. The gases above the liquid surface 9 are discharged from the tank 1 through the pipe 5 which discharge can be further effected by placing a suction pump 19 in the pipe 5. The liquid is sucked into the discharge pipe 14 and into the gas feed zone 17 therein which contains dispersing surfaces 2 and 3 through which gas penetrates and through which the gas to be dissolved is brought in the flowing liquid. The surfaces 2 and 3 can be made e.g. by sintering or they can be perforated in which case the most suitable size of perforation is approximately 1 mm.

The surface 2 is rotatable together with the propeller 4 and air is directed thereto along the hollow shaft 13 and/or through the pipe 15 provided with a adjustable valve 11. Gas into water through the surface 3 is supplied from the source of gas by means of the pipe 8 also provided with a adjustable valve 10.

Since the pressure on the surfaces 2 and 3 is lower than that in the sources of gas, the gas bubbles are detached from the surfaces 2 and 3 quite easily and thus, indeed, a great amount of gas such as oxygene, air or any other oxygen containing gas will be added to the liquid flow to be treated. When the quality of the surfaces 2 and 3, the speed of the flow in the pipe 14, and the underpressure obtained by the pump are all correctly adjusted with regard to the amounts of gas fed by the pipes 13, 15 and 8 then so-called micro bubbles, very small in size, will be produced. Said micro bubbles dissolve rapidly in water and also remains in the flow since there are no other separating gases left in the liquid any longer. The flow speed of the liquid in the gas feed zone and also the pressure can be adjusted at the end of the feed pipe 14 by means of the limiting means 18 above said zone as the supply opening of the pipe 14 can be varied by these limiting means 18.

FIG. 2 shows an embodiment according to the invention which corresponds to the arrangement of FIG. 1 except, that the vibrator 12 is provided with a separate drive motor 21 whereby the actual separation step does not depend on the rotation speed of the dispersion means 2 or the propeller 4. Furthermore, in this embodiment which produces vibrations in the liquid, the vibration frequency can be arbitrarily adjusted without changing the flow rate in the discharge pipe 14. In FIGS. 1 and 2 the vibration means is simply illustrated as eccentric but it is to be noted, however, that vibration producing means can be any vibrator with any frequency, e.g. ultrasound, without departing from the scope of the invention. The vibrator to be used in the device can be placed anywhere in the area of the suction pipe 6 and the pump means can be of any known type.

The surfaces 2 and 3 through which gas can flow need not be placed exactly where they are placed in the drawings. The surface 3 is mainly symbolizing the fact that the surface is stationary and the surface 2, on the other hand, symbolizing the fact that the surface can be mechanically rotated with regard to flowing water whereby gas bubbles are even more effectively detached from the surface since the underpressure on the surface, according to Bernoulli's theorem will be, even lower than previously. Similarly the shape of the surfaces can very considerably depending upon each particular purpose of use and construction of the device, and it is often advantageous to use just one of the surfaces 2 and 3 thus simplitying the structure of the device.

In FIG. 3 the device consists of a rather large and in bottom, conically tapering vessel 44. In the middle of this vessel is disposed a downwardly opening, tunnel-like tube 10 centrally of which, in turn, there is disposed another and longer tube 32 extending down near the bottom of the vessel 44.

The water to be cleaned (arrow 46) is led through the inlet tube 45 to the device to the upper end of the supply tube 32. The liquid will be pressed downwards along this supply tube by means of propeller 37 driven by motor 36.

Adjacent the lower end of the supply tube 32 there are disposed guide plates or guide rings 39 directing liquid flow coming from the supply tube 32 back upwards along the outer surface of the supply tube 32. This upwardly directed flow is furthermore guided by the conically outwardly opening edge portion of the tunnel means 40.

Inside the tunnel means 40 towards the upper end of the supply tube there are disposed two annular members 33 and 34 which effect pressure stroke on passing liquid thus releasing gases dissolved therein, e.g. carbon dioxide, hydrogen sulphide etc.

The released gases will be removed from the device along a gas outlet tube 53.

The liquid free of dissolved gases is fed through the openings 35 above the vibration ring 34 at the upper end of the supply tube 32 into the supply tube 32 due to the suction produced by the propeller 37 and will be repressed downwards along the supply tube 32. Above the propeller 37 its drive shaft carries an oxygen gas or air feeding means 38 which is a porous cylinder connected to an outside source of gas. Since the gas feeding means is located on the suction side of the propeller, gas feeding does not necessarily require excess pressure.

The liquid free of gases and oxidized or aerated will be pressed downwards inside the tube 32 by the propeller 37 and as it is discharged therefrom most of the liquid will be directed upwards along the outer surface of the tube 32 due to the guide plates 39. The lower end of the tube together with the conical bottom of the vacuum vessel 44 thus constitutes the actual oxidation area for waste water.

The upper part of the tunnel means 40 makes up the flotation zone 41 of the device. Flotation is created by the gas released from the liquid by means of the vibration means 33 and 34 and, on the other hand, it is also created by upwardly directed liquid flow in the tunnel means 40. Impurities on the surface of liquid will be removed by means of a regular screw transporter 48 and waste (arrow 50) will be removed along the outlet pipe 47. By means of the pump 49 reduced pressure can be maintained in this pipe in order to facilitate the outfeed and to remove gases.

In the upper part of the vessel 44 outside the tunnel means 40 there is formed the third zone 43 of the device which zone serves as the settling zone and which comprises an overflow 51 for purified water.

The device can operate continuously in which case untreated waste water is continuously added to circulating liquid, or the operation can take place in sequence in which case the circulating liquid is completely cleaned until new water ration is added.

In the embodiment illustrated in the FIG. 3 the vessel 44 is provided with a conical bottom for collection of eventual sediment.

To remove the sediment a tube 52 is connected to the bottom equipped with a pump (not shown).

Thus, the above described device comprises the vessel 44 which houses gas outlet and inlet means with their supply tube and tunnel means. Thus the device, as such, constitutes a purification plant for waste water. It is, however, quite possible to use the tunnel means - supply tube assembly as such and independently, and to dispose the device in any kind of vessel or pool whereby the device serves either as a purification plant for waste water, or as an oxidizing device for water (increases the oxygen content in water). The device can even be independently placed in such a water course (lake, river etc.) the oxygen content of which is to be increased. Naturally the device in this case must be provided with suitable pontoons or the like.

I claim:

1. A method for increasing the oxygen content of water for sanitizing natural waters and for purifying water, in which method oxygen or oxygen containing gas is fed into water liberated from gases dissolved therein, characterized in that gases are separated by pressure strokes on the liquid and vibration whereafter oxygen or oxygen containing gas, is fed into the liquid, and water flowing along the suction pipe is set to vibrate by means of a vibrator; said water being discharged and noxious gases escaping from the water; said water being forced by means of a propeller pump and the resultant pressure developed in said water into a gas feed zone provided by dispersion means, said zone being connected to a source of gas through pipes, gas bubbles formed on wet surfaces of the dispersion means for dispersing said bubbles said bubbles being mixed with flowing water, said propeller pump forcing said water with gas bubbles into a discharge pipe and therealong to the desired depth.

2. A method according to claim 1, characterized in that the pressure strokes and vibration is continuous.

3. A method according to claim 2, characterized in that the vibration zone and the suction zone is under reduced pressure.

4. A device for increasing the oxygen content of water in which oxygen is fed into said water liberated from gases dissolved therein said device including a suction pipe and a discharge pipe for water, a rotary propeller, a motor for rotating said propeller, and gas feeding means, characterized in that said suction pipe houses a vibration means for vibrating said liquid and said supply pipe (14, 32) houses a gas feed zone which includes a dispersion means for dispersing bubbles of said gas, said dispersion means being disposed centrally in the pipe, optionally provided with outer annular dispersion means.

5. A device according to claim 4 comprising rotating central dispersion means.

6. A device according to claim 4, characterized in that the vibrator is a pressure stroke means, a source of ultra sound, or a mechanical vibrator.

7. A device according to claim 6, characterized in that the vibrator is continually operating.

8. A device according to claim 4, characterized in that the vibration means producing pressure strokes is eccentrically carried by the shaft of the motor.

9. A device according to claim 4, characterized in that the vibration means is carried by the shaft of the motor of the rotary propeller.

10. A device according to claim 4 for purifying waste water comprising an oxidation zone, flotation zone and a settling zone, characterized in that the main flow of the liquid to be cleaned is, circulated to the flotation zone, and the gas dissolved therein is removed and oxygen containing gas or air is fed into the treated liquid.

11. A device according to claim 10 in which the oxidation zone is below the flotation zone and the settling zone.

12. A device according to the claim 10, characterized in that the flotation zone consists of a cylindrical, downwardly opening tunnel means which houses an open top supply tube extending into the oxidation zone which tube comprises a per se known oxidation and circulation means for liquid, and to the outer wall of which tube is secured at least one vibration means.

13. A device according to the claim 12, characterized in that the lower end of the tube is provided with guide plates of rings.

14. A device according to the claim 12, characterized in that the vibration means consists of two ring means which are disposed inside the tunnel means and which produce pressure strokes.

15. A device according to claim 10 comprising a tube for removing flotated slurry and being equipped with a screw transporter.

16. A device according to claim 15, in which the tube is connected to a vacuum pump obtaining reduced pressure in the space above the flotation zone.

* * * * *